Sept. 3, 1968  C. G. F. HONIGH  3,399,537
METHOD OF LIQUEFYING CHLORINE BY ABSORPTION
IN AND DESORPTION FROM A SOLVENT
Filed Jan. 18, 1966

INVENTOR
CHRISTIAAN GERARD FREDERIK HONIGH

United States Patent Office 3,399,537
Patented Sept. 3, 1968

3,399,537
METHOD OF LIQUEFYING CHLORINE BY ABSORPTION IN AND DESORPTION FROM A SOLVENT
Christiaan Gerard Frederik Honigh, Delden, Netherlands, assignor to N.V. Koninklijke Nederlandsche Zoutindustrie, Hengelo, Netherlands
Filed Jan. 18, 1966, Ser. No. 521,300
6 Claims. (Cl. 62—17)

ABSTRACT OF THE DISCLOSURE

In a method of liquefying gaseous chlorine by multi-step absorption in and desorption from a solvent such as carbon tetrachloride, the absorption in the first step is effected under conditions of perfect mixing or in co-current relationship so as to substantially attain an absorption equilibrium between the rich solution to be discharged from the first step and the remaining gas to be discharged from this step whereby a greater amount of water vapor present in the gaseous chlorine is taken up in the rich solution and is discharged therewith from the first step so that troubles caused by the water content of the remaining gas in further absorption steps are less likely to occur than in case of effecting the absorption in the first step in counter-current relationship.

Background and summary of the invention

This invention relates to an improved method for liquefying chlorine using an absorption and desorption process in which lower processing temperatures may be employed without water separation during processing.

As an alternative to the usual process for liquefying chlorine based on compression and cooling, a method may be used wherein the chlorine is absorbed in a solvent in a number of steps and then is desorbed from the solution of chlorine formed. Such methods have been disclosed, for example, in the French specification 866,780, the Swiss application 302,144 and the British specification 801,730, disclosing essentially the same absorption and desorption process while using different solvents.

The specifications mention that the process may not only be used in case of gas mixtures containing, in addition to chlorine, relatively large amounts of other gases but also in case of gases mainly consisting of chlorine, such as the gas obtained from electrolysis of brine.

Though, usually, such a gas is subjected to a drying operation before the chlorine is liquefied, it always still contains a certain amount of water vapor. If the absorption is entirely carried out in countercurrent relationship, as disclosed in the specifications mentioned hereinbefore, there is a risk of separation of liquid water at certain spots in or between the absorption steps, which may give rise to serious corrosion phenomena.

To a great extent, this danger presents itself when, in view of minimizing the cooling costs, the first absorption steps are cooled with cooling water. As a matter of fact, at the temperatures then prevailing in these steps, the application of the countercurrent principle has as a result that the total amount of water present at each point in the dissolved state and in vapor form increases in the direction of flow of the gas.

It is, therefore, an object of the present invention to provide an improved method for liquefying chlorine using an absorption and desorption process in which water separation is inhibited even at lower processing temperatures.

The present invention is based on the recognition of the risk of water separation and on the insight that it can be reduced when the stream of chlorine gas is not, or not only, contacted with the formed chlorine solution to be discharged in entering into the first absorption step, but when the formed solution or part thereof and the gas stream are contacted with each other in a later stage of the absorption, wherein the water vapor content of the gas has increased.

In accordance with the above object, the invention relates to a method of liquefying chlorine by absorption in and desorption from a solvent, wherein a stream of chlorine gas containing small amounts of impurities, among which water vapor, is contacted with a solvent for chlorine in an absorption section comprising a number of steps and wherein the rich solution of chlorine formed is heated in a distillation section so as to desorb chlorine gas which is liquefied by cooling, while the remaining poor solution is returned to the absorption section. According to the invention, this method is characterized in that a mass exchanging contact between at least part of the rich solution to be discharged from the absorption section and the gas stream is provided for, after at least half of the amount of chlorine originally present has already been absorbed from the gas stream.

Due to the invention, a larger amount of water is discharged from the absorption section by the rich solution than is the case in the known manner of carrying out the method. Among other advantages, this means that a temporary rise in the moisture content of the stream of chlorine gas supplied to the installation is less likely to cause corrosion and troubles in the operation. As a matter of fact, the conditions under which water is separated and/or solid chlorine hydrate is formed are not reached as easily.

Seen from another point of view, the invention implies that with the same moisture content of the supplied gas, the temperature of the last absorption step may be chosen lower than is the case in the known embodiments of the absorption method. This permits a further lowering of the chlorine content of the residual gas and a further reduction of the solvent losses.

The mass exchanging contact to be applied according to the invention can be effected in several ways. For example, the countercurrent principle may be maintained in the first and, the case being, also in the following absorption steps and the gas stream discharged from the first step may be contacted with part of the rich solution discharged from the first step in a washing tower or like apparatus, before the gas stream is supplied to the second absorption step. However, preferably, the mass exchanging contact is effected by carrying out the absorption in the first step such that the residual gas stream to be discharged from this step and the rich solution which is also to be discharged are susbtantially in equilibrium with each other.

This is the case when the gas stream and the solvent are passed through the first step in the same direction, but also when in the first step the gas stream is introduced into the rich solution which is being formed and which is substantially kept at a constant level, under conditions essentially corresponding to perfect mixing. Generally, the last mentioned embodiment is preferred, since the entire processing system can more effectively be secured against the danger of explosions which may occur at varying gas loads when the gas stream contains hydrogen or another gas capable of forming an explosive mixture with chlorine, as an impurity.

The advantages attained by the invention more than counterbalance the circumstance that in using the invention, the concentration of the rich chlorine solution to be reached is slightly less and, accordingly, a somewhat larger amount of solvent must be kept in circulation.

In an advantageous embodiment of the method according to the invention, the absorption is effected in three successive steps, wherein not more than 5% of the total amount of the recycled poor solution is passed through the last absorption step which is kept at a considerably lower temperature than the preceding steps, as described per se in the co-pending U.S. application 376,972 of June 22, 1964, now abandoned, and wherein the main stream of the poor solution is successively passed through the second and the first absorption steps which are both operated essentially under conditions of perfect mixing.

*Brief description of the drawings*

Having briefly described the invention, it will be described in greater detail in the following detailed description which may be more easily understood by reference to the accompanying drawings, of which.

*Description of the preferred embodiments*

Figure 1:
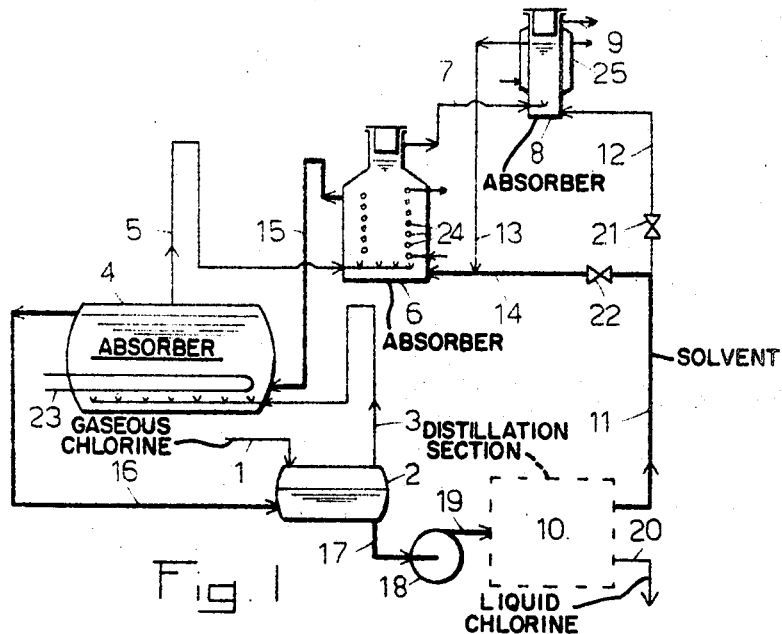
FIG. 1 is a schematic diagram of a processing plant using the method of the present invention.

In the installation according to FIG. 1, the stream of chlorine gas, supplied through conduit 1, is passed first through buffer vessel 2 before the gas stream is introduced through conduit 3 into bubble vessel 4 which is the first absorption vessel and in which the rich solution of chlorine formed is kept at a constant level.

The portion of the gas which has not been absorbed flows through conduit 5 to vessel 6 which is the second absorption vessel and in which a constant liquid level is also maintained. The gas discharged from the second step is introduced through conduit 7 into vessel 8 which, in this embodiment, is the third and last absorption step. The residual gas which has not been absorbed is discharged through conduit 9.

The solvent, for example, carbon tetrachloride, is supplied from the distillation section 10 through conduit 11. The solvent thus supplied usually contains a certain amount of chlorine and, therefore, is referred to as the "poor solution." A branched off conduit 12 thereof supplies a small portion of the solvent stream to the last absorption vessel 8. The solution formed in this vessel is supplied through overflow conduit 13 to conduit 14, through which the main stream of the poor solution is passed, and is supplied to the second absorption vessel 6 together with said main stream.

The solution formed in this vessel flows through overflow conduit 15 to the first vessel 4, in which the chlorine content of the liquid stream increases further. The rich solution formed leaves vessel 4 through overflow conduit 16 and is passed through buffer vessel 2, conduit 17, pump 18 and conduit 19 to the distillation section, in which the solution is separated into the poor solution to be returned through conduit 11 and chlorine gas (containing water vapor) which is condensed and is discharged through conduit 20 as liquid chlorine.

Valves 21 and 22 are arranged in conduits 12 and 14, respectively, for controlling the branched off stream and the main stream of the returned poor solution.

The three absorption vessels are provided with cooling means which are shown in vessel 4 as a hairpin-like cooling tube 23, in vessel 16 as a cooling coil 24 and at vessel 8 as a cooling jacket 25.

Figure 2:
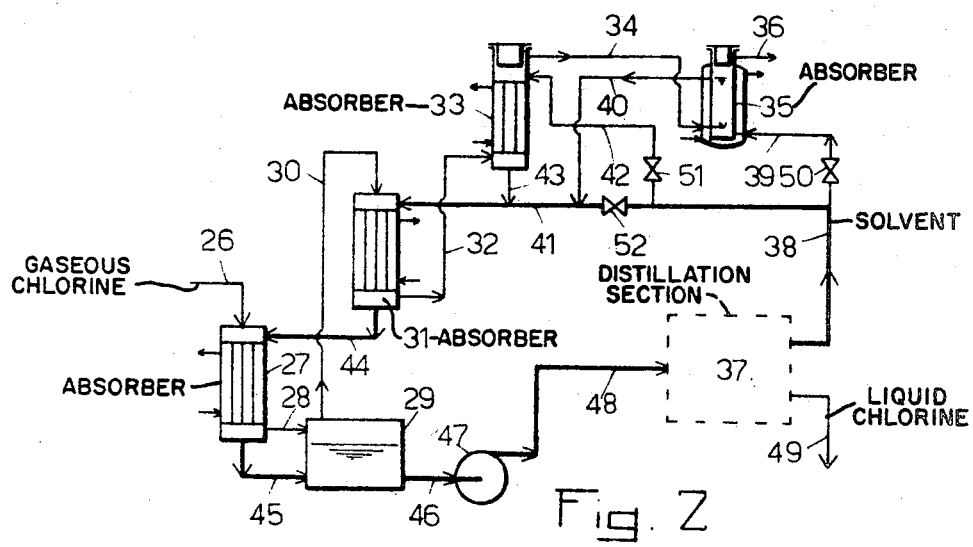
FIG. 2 is a schematic diagram of a processing plant using another embodiment of the present invention.

The installation according to FIG. 2 has four absorption steps, the first two of which are passed by the main stream of the solvent. As in FIG. 1, the main stream cycle has been indicated with heavy lines. The gaseous chlorine is supplied by conduit 26 and is successively passed through co-current absorber 27, conduit 28, buffer vessel 29, conduit 30, a second co-current absorber 31, conduit 32, countercurrent absorber 33, conduit 34 and a last absorber 35, in which a constant liquid level is maintained. The residual gas which has not been absorbed is discharged through conduit 36.

In this embodiment too, the distillation section 37 has been indicated schematically. The poor solution separated therein is returned to the absorption section of the installation through conduit 38. A portion of the solvent is supplied through branched off conduit 39 to the last absorber 35. The solution formed therein is supplied through overflow conduit 40 to conduit 41, through which the main stream of the solvent is passed. A second branched off conduit 42 supplies another portion of the solvent to absorber 33 and the solution discharged therefrom is passed through conduit 43 to the main stream. This main stream, together with the solutions formed in the absorbers 35 and 33 and combined with the main stream, is passed through the absorbers 31 and 27 in the same direction as the gas stream.

The liquid conduit connecting the second and the first absorbers has been indicated with 44 and the conduit discharging liquid from the first absorber has been indicated with 45. The last conduit supplies the rich solution obtained to buffer vessel 29, from which the solution is passed through conduit 46, pump 47 and conduit 48 to the distillation section 37. The conduit for discharging the liquefied chlorine has been indicated with 49. Valves 50, 51 and 52 serve for controlling the branched off streams and the main stream of the recycled poor solution.

In this embodiment, the first three absorbers are film absorbers, in which the solvent flows along the inner wall of pipes which are cooled externally. As already mentioned herein before, the last absorber 35 is in the form of a vessel, in which a constant liquid level is maintained. The vessel is surrounded by a jacket, through which a coolant is passed. For the purposes of explanation, but not by way of limitation, a specific example of the processing steps are set forth in the following example.

*Example*

41.4 mol/sec. of electrolysis gas (98% chlorine) having a pressure of 3 atm. are supplied through conduit 1 of an installation according to FIG. 1. The gas contains 30 mol p.p.m. of water vapor. From the first absorber 4, in which a temperature of 25° C. is maintained, 9.05 mol/sec. of gas containing 118 mol p.p.m. of water vapor are discharged through conduit 5, while the solution formed, consisting of 65 mol percent of carbon tetrachloride and 35 mol percent chlorine and containing 11.0 mol p.p.m. of water, is discharged through conduit 16 in an amount of 145.0 mol/sec.

This solution is separated in distillation section 10 into 40.25 mol/sec. of liquid chlorine containing 39.6 mol p.p.m. of water and 104.75 mol/sec. of a water free solution still containing 10 mol percent of chlorine. Of this solution, 14.95 mol/sec. are supplied to the last absorber 8 which is kept at −40° C., while 89.8 mol/sec. are directly passed through conduit 14 to the second absorber 6, together with 15.9 mol/sec. of the solution discharged through conduit 13 from the last absorber and containing 13.8 mol p.p.m. of water.

The combined liquid stream is contacted with the 9.05 mol/sec. of gas from line 5 in absorber 6 kept at 25° C., whereby 6.95 mol/sec. of chlorine are absorbed as yet. The enriched solution obtained (112.65 mol/sec.) and containing 9.4 mol p.p.m. of water is passed through conduit 15 to the first absorber 4 and 2.10 mol/sec. of gas which has not been absorbed and which contains 112 mol of p.p.m. of water vapor is passed through conduit 7 to the last absorber 8. From this absorber, 1.15 mol/sec. of residual gas containing 12 mol p.p.m. of water vapor is discharged.

Even at the low cooling temperature of −40° C. used in the last absorption step, nowhere in the installation does the water content reach the solubility limits.

This invention may be variously modified and embodied within the scope of the subjoined claims.

What is claimed is:

1. In a method of liquefying chlorine by absorption in and desorption from a solvent, wherein a stream of gaseous chlorine containing small amounts of impurities, among which is water vapor, is contacted with a solvent for chlorine in an absorption section comprising at least two successive absorption steps in distinct separately contained zones of absorption wherein the gas flows through the first and second absorption zones successively and the solvent flows through the second and first absorption zones successively, in the first of which absorption zones at last half the amount of chlorine originally present in said gas stream is absorbed whereby a residual gas stream to be passed to the second absorption zone remains and a rich solution is formed, said rich solution is discharged from said first absorption zone and is then heated in a distillation section so as to desorb gaseous chlorine which gaseous chlorine is subsequently liquefied by cooling, while the remaining poor solution is returned to said second absorption zone as the solvent, the improvement which comprises preventing separation of liquid water from the gas stream beyond the first absorption zone by reducing the relative water vapor content remaining in the gas traversing the first absorption zone by flowing the gas stream and the liquid solvent through the first absorption zone in the same direction whereby the gas flows in contact with the rich solvent without stripping water from the chlorine solution.

2. The method as claimed in claim 1, wherein in said first absorption zone said stream of gaseous chlorine is introduced below the level of a pool of rich solution being formed therein and maintained at a substantially constant level, the absorption in said first zone being effected under conditions essentially corresponding to perfect mixing, and while both the gaseous chlorine and the rich solution flow upward to discharge from the space wherein they are brought into contact in said first absorption zone.

3. A method of liquefying chlorine contained in a gas stream in admixture with small amounts of impurities, among which is water vapor, comprising
 (a) circulating a liquid solvent for chlorine alternatingly through a desorption section and an absorption section said absorption section comprising distinct separately contained zones of absorption wherein the gas flows through first, intermediate and final absorption zones successively and the solvent flows through the last, intermediate and first zones successively, the stream of solvent discharged from said desorption section being divided into at least one branch stream and a main stream, a branch stream of not more than 5% of said stream of solvent discharged from said desorption section being passed through said final absorption zone which is kept at a considerably lower temperature than said other absorption zones, at least one of said branch and main streams being passed through the intermediate absorption zone, and the combined branch and main streams being passed through said first absorption zone,
 (b) passing said gas stream successively through said first absorption zone, each intermediate absorption zone and said final absorption zone, and contacting said gas stream in said absorption zones with the solvent streams passed therethrough, the contact in said first absorption zone being effected under such conditions that at least half the amount of chlorine originally present in said gas stream is absorbed in said combined branch and main streams of solvent and that the rich solution formed in and to be discharged from said first absorption zone and the remaining gas stream to be discharged from said first zone are substantially in absorption equilibrium with each other at the moment they are discharged from said first zone for being supplied to said desorption section and the successive intermediate absorption zone, respectively,
 (c) heating said rich solution in said desorption section so as to desorb gaseous chlorine and to leave a lean solution,
 (d) returning said lean solution to said absorption section, and
 (e) liquefying said gaseous chlorine by cooling.

4. The method as claimed in claim 3 wherein the contact between said gas stream and said combined branch and main streams of solvent in said first absorption zone is effected essentially under conditions of perfect mixing of the liquid phase.

5. The method as claimed in claim 4 wherein, in addition to said first absorption zone, the intermediate absorption zone next to said first absorption zone is passed by said combined branch and main streams of solvent and wherein the contact between said remaining gas stream discharged from said first absorption zone and said combined streams of solvent in said intermediate absorption zone next to said first absorption zone is effected essentially under conditions of perfect mixing of the liquid phase.

6. In a method of liquefying chlorine by absorption in and desorption from a solvent, wherein a stream of gaseous chlorine containing small amounts of impurities, among which is water vapor, is contacted with carbon tetrachloride as a solvent for chlorine in an absorption section comprising three successive absorption zones, in the first of which at least half the amount of chlorine originally present in said gas stream is absorbed whereby a residual gas stream to be passed to the second absorption zone remains and a rich solution is formed, said rich solution is discharged from said first absorption zone and is then heated in a distillation section so as to desorb gaseous chlorine which gaseous chlorine is subsequently liquefied by cooling, returning lean solution from said distillation section to said absorption zones as the solvent, wherein not more than 5% of the total amount of the recycled poor solution is passed through the last absorption zone in cocurrent flow to the gas stream and with the last absorption step kept at a considerably lower temperature than the preceeding steps, and wherein the main stream of the solution is successively passed through the second and the first absorption steps which are both operated essentially under conditions of perfect mixing, the improvement which comprises effecting the absorption in said first absorption zone so as to discharge said rich solution and said residual gas stream substantially in equilibrium with each other, said stream of gaseous chlorine in said first absorption zone being introduced below the level of a pool of rich solution formed in the first absorption zone and maintained at a substantially constant level while the gaseous chlorine and the enriched solution travel in cocurrent flow, the absorption in said first zone being effected under conditions essentially corresponding to perfect mixing.

References Cited

UNITED STATES PATENTS

| 1,338,654 | 4/1920 | Henderson | 62—17 |
| 2,402,978 | 7/1946 | Allen et al. | 62—71 X |
| 2,656,011 | 10/1953 | Frey. | |
| 2,868,325 | 1/1959 | Cathala | 55—71 X |
| 2,909,240 | 10/1959 | Colton | 55—71 |
| 2,364,660 | 12/1944 | Reid | 62—17 XR |
| 2,995,903 | 8/1961 | Schmalenbach | 62—17 |

FOREIGN PATENTS 866,780  9/1941  France.

NORMAN YUDKOFF, *Primary Examiner.*

V. W. PRETKA, *Assistant Examiner.*